Nov. 17, 1931.      S. B. HASELTINE      1,831,910
HAND BRAKE
Filed Jan. 27, 1930
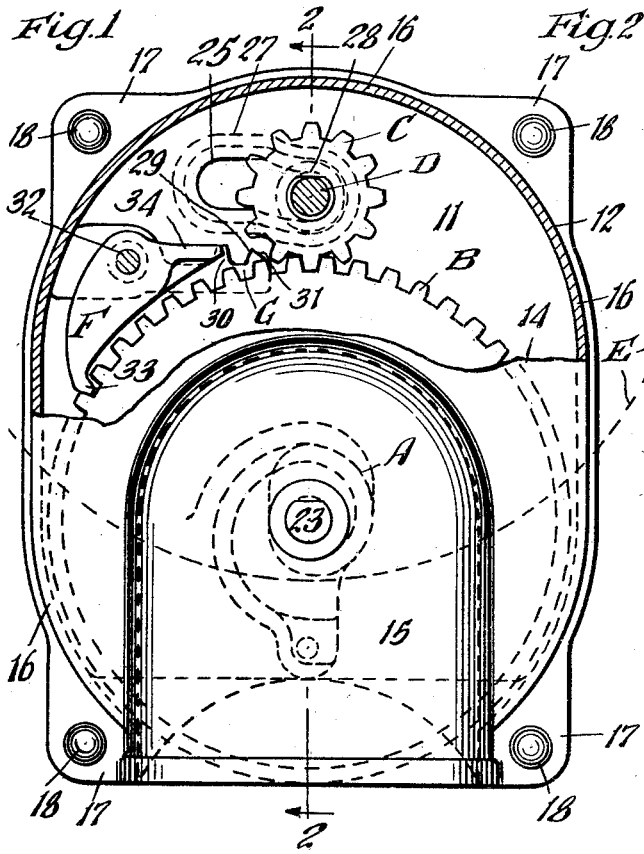
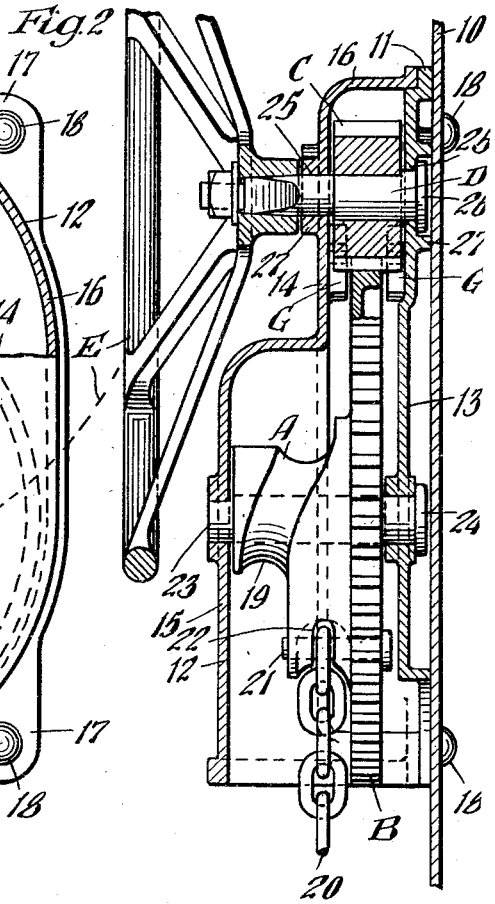
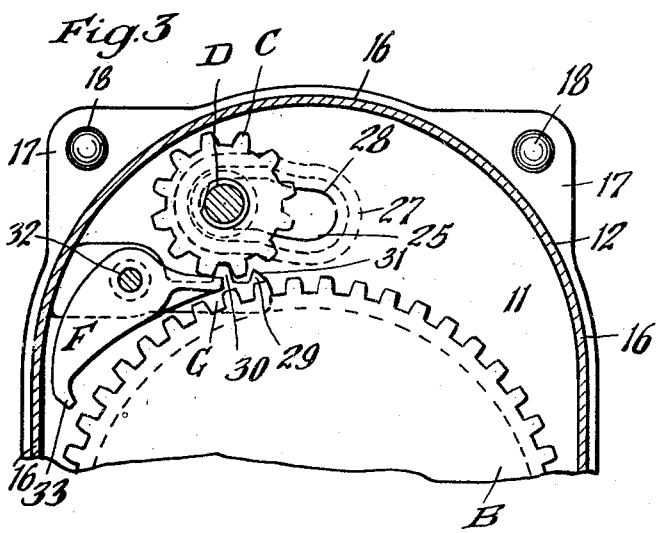
Inventor
Stacy B. Haseltine
Witness
Wm. Geiger
By Joseph Harris
His Atty.

Patented Nov. 17, 1931

1,831,910

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

HAND BRAKE

Application filed January 27, 1930. Serial No. 423,656.

This invention relates to improvements in hand brakes.

One object of the invention is to provide a simple and efficient hand operated brake mechanism for railway cars, wherein all of the operations necessary to apply and release the brakes are effected by a single manually operated member, operation of which in one direction causes tightening of the brakes, and through which by operation in a reverse direction the tightening mechanism is completely released, the improved mechanism being particularly designed to maintain and assure operative engagement of the driving parts of the brake mechanism during the tightening operation.

A more specific object of the invention is to provide a hand brake mechanism of the character indicated in the preceding paragraph, including a chain winding element having a driving gear connected thereto; a manually operative pinion movable toward and away from the gear to effect either operative engagement thereof or separation of the same; and a locking dog for preventing retrograde rotation of the winding element, wherein the pinion during rotation thereof in reverse directions is moved toward and away from said gear by engagement with fixed rack means, and means for guiding the pinion in its movement toward and away from the gear is provided, said guide means including trunnions on the pinion, and guideways on the brake supporting means, whereby operative engagement between the pinion and gear during winding of the brake chain is assured and maintained by providing said guideway with an offset section in which the trunnions are seated when the gear and pinion are operatively engaged.

Other objects of the invention will more clearly appear from the description and claims hereinafter following.

In the drawings, forming a part of this specification, Figure 1 is a vertical, part elevational and part sectional view through my improved brake mechanism, the view being in a plane parallel to the end wall of the car on which said mechanism is mounted. Figure 2 is a vertical, sectional veiw in a plane at right angles to the plane of the sectional view in Figure 1, and corresponding substantially to the line 2—2 of said figure. And Figure 3 is a view similar to Figure 1, partly broken away, but showing the parts in a different position.

In said drawings, 10 designates the vertical end wall of a railway car on which my improved brake mechanism is supported. The brake mechanism is preferably mounted within a housing so as to protect the parts thereof.

In carrying out my invention, I provide a two part housing within which the operating parts of the brake mechanism are mounted, the housing including a rear section 11 and a front section 12. The rear section 11 is in the form of a substantially rectangular plate-like member and has the main portion thereof inwardly offset, as indicated at 13, so as to provide a space between the plate and the wall 10 of the car to accommodate the heads of certain shafts of the mechanism as hereinafter more fully described.

The section 12 of the housing forms a cover member and is secured to the section 11 in any suitable manner. As shown, the cover member 12 has an outer wall 14 spaced from the wall 13 and parallel thereto. A portion of the wall 14 at the lower end of the housing is outwardly offset, as indicated at 15, thereby providing a relatively wider section at the lower portion of the housing to accommodate the chain winding drum. The cover member 12 is provided with top and side wall portions 16, which are formed integral with the front wall thereof. The wall portions 16 are provided with laterally extending portions 17—17 at the four corners of the cover member, these portions being in effect securing lugs and serving to connect the cover member to the plate 11. The section of the cover member defined by the outstanding lug members 17 is of substantially the same shape as the plate 11 and registers therewith. The cover member 12 is secured to the plate 11 by rivets 18—18 extending through the lugs 17 of the cover member and the four corner portions of the plate 11. The rivets 18 are preferably also employed to secure the housing to the end wall 10 of the car and extend through said wall, as clearly shown in Figure 2.

My improved hand brake mechanism proper comprises broadly a chain winding drum A; a driving gear B; a pinion C; an operating shaft D, a hand wheel E, a locking dog F, and rack members G—G.

The chain winding drum is of substantially conical form and has a chain winding groove 19 thereon. The brake chain, which is indicated by 20, is connected to the brake mechanism proper of the car, not shown, in the usual manner, the inner end of the chain being secured to the drum A by means of a pin 21, the end link of the chain being disposed in a recess 22 of the drum and the pin extending through said end link. The chain winding drum A preferably has a gear B formed integral therewith and these two members are rotatably supported on a shaft 23 having its opposite ends supported in the front and rear walls of the housing, said walls being provided with alined openings to receive the shaft. As shown, the shaft 23 is provided with a head 24 at the inner end thereof, which is accommodated between said rear wall and the end wall of the car. As will be evident, when the housing is secured in position on the end of the car, the head 24 is confined between the housing and the end wall of the car so that the same will be retained in position.

The pinion C, which cooperates with the gear B, is accommodated within the upper part of the housing between the front wall portion 14 and the plate 11. The pinion is mounted on the shaft D to which it is secured. As shown, the shaft D is flattened at one side and said flattened portion engages with a flattened wall portion in the opening of the pinion, thereby locking the pinion to the shaft. The opposite ends of the shaft D extend through the front and rear walls of the housing, the same being accommodated for lateral movement in alined guide slots 25—25 provided in the front and rear walls of the housing. The guide slot 25 in the front wall is suitably reinforced by an outstanding flange, which surrounds the opening thereof. The shaft D is headed at the inner end, as indicated at 26, this head being accommodated between the plate 11 of the housing and the end wall 10 of the car. Adjacent the guide slot 25, the rear wall of the housing is provided with an outstanding rib or flange member 27 which surrounds the guide opening but is spaced therefrom so as to accommodate the head 26 for movement. As clearly shown in Figure 1, the guide slots 25 extend generally in a horizontal direction but the inner end portion of each slot, that is the righthand end portion as viewed in Figure 1, is downwardly offset with respect to the remainder of the slot, as indicated at 28. As will be evident, when the shaft D is disposed within the downwardly offset sections 28—28 of the two slots 25, the pinion C will be held in engagement with the gear B. The outer end of the shaft D projects a considerable distance beyond the outer wall of the housing and has the hand wheel E fixed thereto. The outer end portion of the shaft, on which the hand wheel is mounted, is of substantially square cross section, as shown, and the hub portion of the hand wheel is provided with an opening of similar cross section within which the end of the shaft fits. The hand wheel is retained in position by the usual securing nut on the outer end of the shaft D.

Adjacent the gear B and the guide slots 25—25, the housing is provided with the fixed rack members G—G, each rack member being formed integral with one of the housing walls and projecting inwardly from the front and rear walls respectively. As shown, the rack member is provided with a pair of teeth 29 and 30, the tooth 29 being cut away on the outer side as indicated at 31 to provide clearance for the pinion when in operative engagement with the gear B. As shown in Figure 1, the racks G are arranged substantially parallel to the horizontal portions of the guide slots 25—25 and are disposed below the same and spaced such a distance therefrom that the pinion C will mesh therewith when the shaft D is disposed in the horizontal sections of the guide slots. As clearly shown in Figure 1, the innermost tooth 29 of each rack is spaced to the left from a vertical, radial plane passing through the axis of rotation of the chain winding drum and gear B and disposed above the gear so that clearance is provided between the end tooth of the rack and the pinion C when the latter is in operative position, to actuate the gear B in a direction to tighten the brakes. As will be clear upon reference to Figure 2, the rack members G—G are disposed at opposite sides of the gear B and the pinion C is of such a thickness that the teeth thereof engage the gear B and extend beyond opposite sides thereof so as to engage with the rack members G—G when displaced along the guide slots 25—25.

The locking dog F, which is employed to prevent retrograde rotation of the chain winding drum while the brakes are being applied and for locking the brakes after being tightened, is in the form of a pivoted locking member supported on a transversely disposed pivot pin 32 having its opposite ends secured in the front and rear wall portions of the housing. As clearly illustrated in Figure 1, the dog F is pivoted between the rack members G—G and has a downwardly extending section provided with a tooth 33 and adapted to cooperate with the teeth of the gear B. At the opposite end, the dog F is provided with a laterally extending arm 34, which is disposed between the rack members G—G in substantially horizontal position when the tooth 33 is in engagement with the teeth of the gear B. As clearly illustrated in Figure 1, the arm 34 is so arranged that the upper face thereof is normally in alinement with the upper edges of the rack teeth, so that the arm will be engaged by the teeth of the pinion C when the same rolls upon the rack members. As will be evident, when the teeth of the pinion engage the arm 34 of the dog F, the dog will be tripped and is swung on its pivot so as to disengage the tooth 33 thereof from the gear B, thereby permitting free running of the chain winding drum and release of the brakes. The dog is actuated through the influence of gravity and ratchets over the teeth of the gear B when the latter is rotated in a direction to wind the chain on the drum A. It is further pointed out that when the pinion is disengaged from the arm 34 of the dog, the same will swing back to normal position under the influence of gravity.

In a chain tightening operation, the hand wheel E is rotated in a clockwise direction, as viewed in Figure 1, thereby rotating the pinion C in a similar direction and through the pinion effecting rotation of the gear B in a contra-clockwise direction and similar rotation of the drum A, thereby winding the brake chain thereon and tightening the brakes. At this time, the pinion is held in operative engagement by the shaft D engaging the righthand end walls of the slots 25, as viewed in Figure 1. Rotation in a clockwise direction of the shaft causes the same to bear on these end walls. In order to prevent accidental disengagement of the pinion and the gear during the chain tightening operation, the righthand end portions of the slots 25, as seen in Figure 1, are downwardly offset as hereinbefore pointed out, the shaft D being seated in these offset portions while in operative engagement with the gear B. During the chain winding operation, the locking dog F, which cooperates with the gear B, prevents backward rotation of the chain winding drum.

When it is desired to release the brakes, the operating hand wheel E is rotated in a contra-clockwise direction, as viewed in Figure 1. Inasmuch as the dog F at this time prevents rotation of the gear B in a clockwise direction, rotation of the pinion C causes the pinion to travel bodily in a lefthand direction in the guide slots 25, as viewed in Figure 1. As the pinion travels to the left, the shaft D is cammed upwardly by the guide slots 28—28 and at the same time the teeth thereof come into engagement successively with the teeth 29 and 30 of the rack members, thereby disengaging the pinion and gear. Continued rotation of the shaft D in the same direction causes further travel of the pinion to the left. When the pinion approaches the position shown in Figure 3, the teeth thereof will engage the arm 34 of the locking dog F, thereby swinging the toothed end of the dog outwardly away from the gear B, thereby releasing the latter and permitting free running of the chain winding drum and complete release of the brakes.

Assuming that the brake mechanism is left in the condition described in the preceding paragraph after having released the brakes, and the brakeman desires to again apply the brakes, it is merely necessary to rotate the hand wheel E in a clockwise direction. Rotation of the hand wheel in this direction effects travel of the pinion C to the right, as viewed in Figure 1, due to engagement thereof with the rack members G—G. As the pinion travels to the right, the arm 34 of the locking dog will be released, thereby permitting the dog to swing back to the operative position shown in Figure 1. In traveling to the right, the pinion C finally passes off of the rack and into engagement with the teeth of the gear B, whereupon further rotation of the pinion effects rotation of the gear B and the chain winding drum in a direction to tighten the brakes, the brake tightening operation being completed, as hereinbefore pointed out.

From the preceding description taken in connection with the drawings, it will be evident that I have provided an exceedingly simple and efficient hand brake mechanism wherein the attention of the operator is required only in manipulating the hand wheel member, operation of the same in one direction effecting tightening of the brakes and operation of the same in a reverse direction first disengaging the driving means from the winding member and then releasing the locking means so as to permit free running of the chain winding drum and full release of the brakes. It is further pointed out that by providing the pivoted locking dog for preventing retrograde rotation of the chain winding drum and effecting operation and tripping of this dog by movement of the driving pinion, the mechanism is greatly simplified. Further, by providing offset sections at the inner ends of the guide slots which cooperate with the guide means of the pinion, operative engagement of the pinion with the driving gear is assured during the chain tightening operation.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with chain tightening means; of a driving member connected thereto; a manually actuated operating element movable toward and away from said driving member to operatively engage the same therewith and effect disengagement thereof; and a releasable locking dog for preventing retrograde movement of the tightening means, said dog being actuated by movement of said manually actuated operating element away from such driving member, to retract said dog from operative locking position and thereby allowing free movement of the tightening means to completely release the brakes.

2. In a hand brake mechanism, the combination with chain tightening means; of a driving member connected thereto; a manually actuated operating element movable toward and away from said driving member to operatively engage the same therewith and effect disengagement thereof; and means for preventing retrograde rotation of the winding means including a locking member, said locking member being engaged by said operating element when moved away from said driving member to unlock the same and render said means for preventing retrograde rotation inoperative and permitting full release of the brakes.

3. In a hand brake mechanism, the combination with a rotary chain winding means; of a rotary driving member connected thereto; a manually actuated rotary operating element movable toward and away from said driving member to operatively engage the same therewith and effect disengagement thereof; a guideway; and means on said operating element guided in said guideway for guiding the operating element toward and away from said rotary driving member, said guideway having an offset section in which said last named means is adapted to seat when the operating element is in driving engagement with the driving member.

4. In a hand brake mechanism, the combination with a rotary chain tightening means; of a driving gear connected thereto; a manually actuated operating element movable toward and away from said member, said operating element being rotatable and having a pinion fixed thereto adapted to operatively engage said gear when moved toward the same, said pinion being completely disengaged from said gear when the operating member is moved away from the same; and a locking dog for preventing retrograde rotation of the tightening means, said dog being engaged and tripped by the teeth of said pinion when moved away from the gear, thereby releasing the brakes.

5. In a hand brake mechanism, the combination with a rotary chain-winding means; of a driving gear connected thereto; a releasable locking dog holding said winding means against rotation in unwinding direction; a manually actuated pinion having teeth engaging with the teeth of said gear, said pinion being bodily movable toward and away from said gear to effect operative engagement therebetween and disengagement thereof; means for rotating said pinion in reverse directions, rotation thereof in one direction effecting rotation of the gear and winding means in chain-tighting direction, and rotation thereof in a reverse direction, through engagement of the teeth of the gear and pinion effecting movement of the latter away from the gear while the gear is locked by said dog; and a fixed rack cooperating with said pinion to effect return movement thereof toward said gear when the pinion is rotated in said first-named direction.

6. In a hand brake mechanism, the combination with a rotary chain-winding means; of a driving gear connected thereto, said gear having an annular set of teeth; a manually actuated pinion having an annular set of teeth normally meshing with said gear teeth, said pinion being bodily movable toward and away from said gear to effect operative engagement therebetween and disengagement thereof; means for rotating said pinion in reverse directions; ratchet means for locking said gear against rotation in chain-unwinding direction; a fixed rack cooperating with said pinion and spaced from said gear; and means for guiding said pinion for movement between said rack and gear, rotation of said pinion in chain-unwinding direction effecting movement thereof away from said gear through cooperation of the inter-engaging teeth of the pinion and gear, rotation of said pinion in chain-winding direction, when engaged with said rack, causing said pinion to travel on the rack toward said gear to restore operative driving engagement therebetween.

In witness that I claim the foregoing I have hereunto subscribed my name this 25th day of January, 1930.

STACY B. HASELTINE.